US012768997B2

(12) United States Patent
Ono et al.

(10) Patent No.: US 12,768,997 B2
(45) Date of Patent: Oct. 20, 2026

(54) MONITORING SYSTEM, METHOD, AND NON-TRANSITORY COMPUTER-READABLE MEDIUM STORING PROGRAM

(71) Applicant: NEC Corporation, Tokyo (JP)

(72) Inventors: Yoshimasa Ono, Tokyo (JP); Junichi Abe, Tokyo (JP); Hidemi Noguchi, Tokyo (JP); Akira Tsuji, Tokyo (JP); Jiro Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 865 days.

(21) Appl. No.: 18/025,808

(22) PCT Filed: Sep. 16, 2020

(86) PCT No.: PCT/JP2020/035087
§ 371 (c)(1),
(2) Date: Mar. 10, 2023

(87) PCT Pub. No.: WO2022/059093
PCT Pub. Date: Mar. 24, 2022

(65) Prior Publication Data
US 2023/0333250 A1 Oct. 19, 2023

(51) Int. Cl.
*G01C 3/08* (2006.01)
*G01S 17/66* (2006.01)

(52) U.S. Cl.
CPC .................................... *G01S 17/66* (2013.01)

(58) Field of Classification Search
CPC ............................... G01S 17/66; G01S 7/4876
See application file for complete search history.

(56) References Cited

U.S. PATENT DOCUMENTS

| | | | | |
|---|---|---|---|---|
| 2016/0377707 | A1* | 12/2016 | Sasaki | G01S 17/89 356/4.01 |
| 2018/0164440 | A1* | 6/2018 | Fried | G01S 17/90 |
| 2020/0271451 | A1* | 8/2020 | Carrigg | G05D 1/0214 |

FOREIGN PATENT DOCUMENTS

| | | | | |
|---|---|---|---|---|
| CN | 103542868 B | * | 2/2016 | G01C 11/18 |
| JP | 2005-249743 A | | 9/2005 | |
| JP | 2006-023178 A | | 1/2006 | |
| JP | 2011-205399 A | | 10/2011 | |
| JP | 2017-009558 A | | 1/2017 | |
| JP | 2018-165726 A | | 10/2018 | |

OTHER PUBLICATIONS

International Search Report for PCT Application No. PCT/JP2020/035087, mailed on Dec. 8, 2020.
Written opinion for PCT Application No. PCT/JP2020/035087, mailed on Dec. 8, 2020.

* cited by examiner

*Primary Examiner* — Mark Hellner
(74) *Attorney, Agent, or Firm* — Sughrue Mion, PLLC

(57) ABSTRACT

A monitoring system according to the present disclosure includes: a straight line calculation unit configured to calculate a straight line connecting three-dimensional coordinates of a light source and three-dimensional coordinates of a three-dimensional measuring device configured to measure a target to be measured; an invalid region determination unit configured to define a three-dimension invalid region in which point cloud data acquired by the three-dimensional measuring device is invalid based on the straight line; and a point cloud data processing unit configured to monitor the target to be measured based on the acquired point cloud data and the three-dimension invalid region.

10 Claims, 15 Drawing Sheets

MONITORING SYSTEM, METHOD, AND NON-TRANSITORY COMPUTER-READABLE MEDIUM STORING PROGRAM

This application is a National Stage Entry of PCT/JP2020/035087 filed on Sep. 16, 2020, the contents of all of which are incorporated herein by reference, in their entirety.

TECHNICAL FIELD

The present disclosure relates to a monitoring system, a monitoring method, and a non-transitory computer-readable medium storing a program, each having an object of suppressing erroneous detection of a target to be monitored.

BACKGROUND ART

In facilities having large and complex three-dimensional structures, visual inspections are conducted by patrollers to identify any equipment malfunction due to aging in the facilities. In order to refine such visual inspections, a system is used in which monitoring apparatuses such as cameras are used to make a determination as to whether there is any such equipment malfunction objectively and automatically. As an example of the monitoring apparatuses, LiDAR (Light Detection And Ranging), which is a laser ranging device, can identify the location of an abnormality in the external appearance of a facility by detecting a three-dimensional shape of the facility.

LiDAR irradiates laser light on a target and receives the light reflected from the surface of the target, thereby performing measurement of the distance to the irradiation point based on the time difference between irradiation of the laser light and reception of the reflected light. By changing the irradiation direction, a three-dimensional shape of the target can be acquired in a form of a data group in which the three-dimensional shape of the target is expressed by three dimensional coordinate points.

In the case where the target to be monitored is an outdoor facility, it is assumed that the sun is positioned behind the target to be monitored as seen from LiDAR. In such a case where the irradiation direction of a laser light is in the direction of the sun, sunlight enters the receiver of the LiDAR as a noise causing disturbance in the ranging information, thus making it difficult to determine the exact shape of the target to be monitored.

Patent Literature 1 discloses a controlling device for identifying the position of the sun and then acquiring a camera image in the direction of the sun, and in the case where the brightness of the image is equal to or higher than a predetermined image, controlling a process of laser scanning in the direction of the sun.

CITATION LIST

Patent Literature

Patent Literature 1: Japanese Unexamined Patent Application Publication No. 2017-9558

SUMMARY OF INVENTION

Technical Problem

In the aforementioned Patent Literature 1, an instruction not to carry out scanning in a specific direction needs to be passed on to the main body of a laser ranging device. Contrary to such a configuration, some laser ranging devices are configured to accept instructions for performing scanning of a range only in a specific direction, while others are configured not to accept instructions for designating the range to be scanned. In the case of operating a monitoring system utilizing the aforementioned devices in accordance with the method disclosed in Patent Literature 1, the system does not work as a system that includes a countermeasure against a noise caused by the sun.

The present disclosure has been made to solve such problems. That is, an object of the present disclosure is to provide a monitoring system, a monitoring method, and a monitoring program each adapted to suppress erroneous detection of a target to be monitored in performing monitoring utilizing point cloud data acquired by a laser ranging device.

Solution to Problem

According to the present disclosure, a monitoring system includes: straight line calculation means for calculating a straight line connecting three-dimensional coordinates of a light source and three-dimensional coordinates of a three-dimensional measuring device configured to measure a shape of a target to be measured; invalid region determination means for defining a three-dimension invalid region in which point cloud data acquired by the three-dimensional measuring device is invalid based on the straight line; and point cloud data processing means for monitoring the target to be measured based on the acquired point cloud data and the three-dimension invalid region.

According to the present disclosure, a monitoring method includes: calculating a straight line connecting three-dimensional coordinates of a light source and three-dimensional coordinates of a three-dimensional measuring device configured to measure a shape of a target to be measured; defining a three-dimension invalid region in which point cloud data acquired by the three-dimensional measuring device is invalid based on the straight line; and monitoring the target to be measured based on the acquired point cloud data and the three-dimension invalid region.

According to the present disclosure, a monitoring program causes a computer to execute processing of: calculating a straight line connecting three-dimensional coordinates of a light source and three-dimensional coordinates of a three-dimensional measuring device configured to measure a shape of a target to be measured; defining a three-dimension invalid region in which point cloud data acquired by the three-dimensional measuring device is invalid based on the straight line; and monitoring the target to be measured based on the acquired point cloud data and the three-dimension invalid region.

Advantageous Effects of Invention

According to the present disclosure, a monitoring system, a monitoring method, and a monitoring program each adapted to suppress erroneous detection of a target to be monitored in performing monitoring utilizing point cloud data acquired by a laser ranging device can be provided.

EXAMPLE EMBODIMENT

First Example Embodiment

Figure 1:
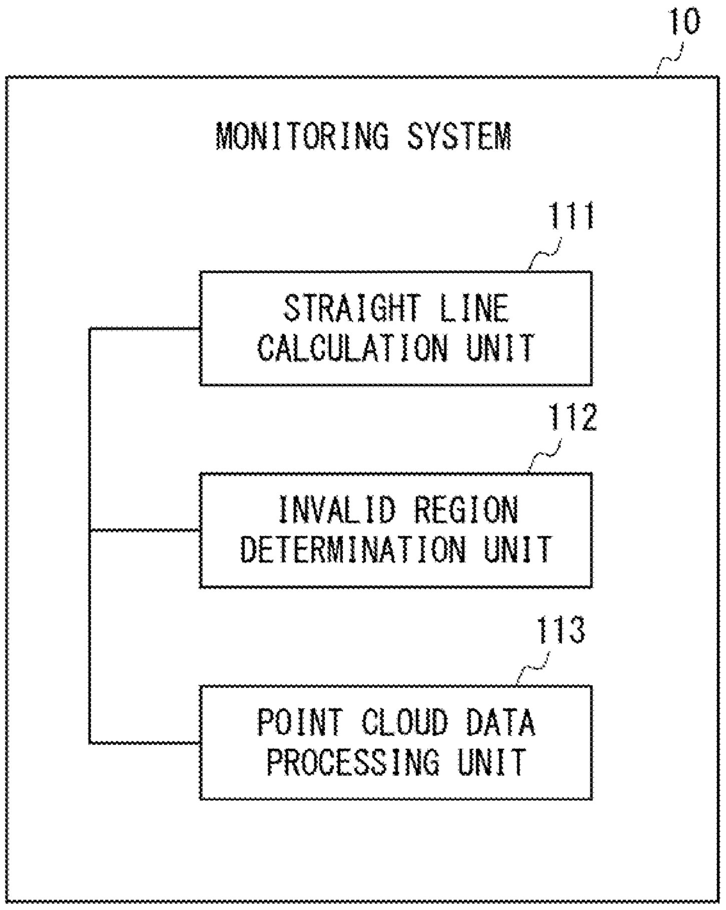
FIG. 1 is a block diagram showing a configuration of a monitoring system according to a first example embodiment.

Hereinbelow, example embodiments of the present disclosure will be described with reference to the drawings. Note that the following description and the attached drawings are appropriately shortened and simplified where appropriate to clarify the explanation. Further, in the drawings, the identical reference symbols denote identical structural elements and redundant explanations thereof are omitted where appropriate.

FIG. 1 is a block diagram showing a configuration of a monitoring system according to a first example embodiment. The monitoring system 10 includes a straight line calculation unit 111, an invalid region determination unit 112, and a point cloud data processing unit 113.

The straight line calculation 111 calculates a straight line connecting the three-dimensional coordinates of a light source and the three-dimensional coordinates of a three-dimensional measuring device that measures a shape of a target to be measured. An example of a three-dimensional measuring device is LiDAR.

The invalid region determination unit 112 identifies the three-dimension invalid region in which the point cloud data acquired by the three-dimensional measuring device is invalid based on the straight line calculated by the straight line calculation unit 111. The three-dimension invalid region is, in other words, a region in which the point cloud data acquired by the three-dimensional measuring device is affected by noise caused by a light source.

The point cloud data processing unit 113 monitors the target to be measured based on the acquired point cloud data and the three-dimension invalid region identified by the invalid region determination unit 112.

The point cloud data processing unit 113 may monitor the target to be measured in such a way that the abnormality within the three-dimension invalid region is not detected. For example, the point cloud data processing unit 113 detects an abnormality in the target to be measured based on the effective point cloud data obtained by removing data included in the three-dimension invalid region from the acquired point cloud data. Further, the point cloud data processing unit 113 may identify the location of the abnormality by identifying the candidates for the location of the abnormality based on the acquired point cloud data and then removing the candidates included in the three-dimension invalid region from the result of the identification. Note that the information about the identified abnormality may also be referred to as abnormality information.

Further, the point cloud data processing unit 113 may identify the location of the abnormality from the acquired point cloud data and then determine whether or not the abnormality is located in the invalid region, and in accordance with the result of the determination, the location of the abnormality may be displayed on a display device (not shown). For example, the location of the abnormality within the invalid region may be displayed in a form that is different from a form of display of locations of other abnormalities whereby the person performing the monitoring work can perform monitoring properly.

As described above, the point cloud data processing unit 113 performs exceptional handling (exception handling) of the acquired point cloud data based on the three-dimension invalid region.

Note that the monitoring system 10 includes a processor that is not shown, a memory, and a storage device. Further, the storage device stores a computer program in which the processing of a monitoring method according to the present example embodiment is implemented. Then, the processor described above loads a computer program from the storage device into the memory and executes the computer program. Accordingly, the processor realizes the function of the straight line calculation unit 111, the invalid region determination unit 112, and the point cloud data processing unit 113.

Further, the straight line calculation unit 111, the invalid region determination unit 112, and the point cloud data processing unit 113 may each be realized by exclusive hardware. Further, whole or a part of the structural elements of the devices may be realized by a general-purpose or dedicated circuitry, processors, etc., or a combination thereof. These elements may be configured as a single chip or may be configured of a plurality of chips connected with one another via a bus. Whole or a part of the structural elements of the devices may be realized by combining the aforementioned circuits and the like and program. Further, as a processor, CPU (Central Processing Unit), GPU (Graphics Processing Unit), FPGA (field-programmable gate array), and the like can be used.

Further, in the case where whole or a part of the structural elements of the monitoring system 10 is realized by a plurality of information processing devices, circuits, etc., the plurality of information processing devices, circuits, etc. may be arranged centrally or distributedly. For example, the information processing apparatus, circuitry, or the like may be implemented in a form in which the components or the like are connected through a communication network, i.e., may be implemented as a client-server system, a cloud computing system, or the like. Further, the function of the monitoring system 10 may be provided in a form of SaaS (Software as a Service).

The monitoring system according to the first example embodiment identifies the three-dimension invalid region that is affected by noise based on the straight line connecting the light source and the three-dimensional measuring device and monitors the target to be measured based on the three-dimension invalid region. Accordingly, the monitoring system according to the first example embodiment can suppress erroneous detection of a target to be monitored due to noise.

Second Example Embodiment

Figure 2:
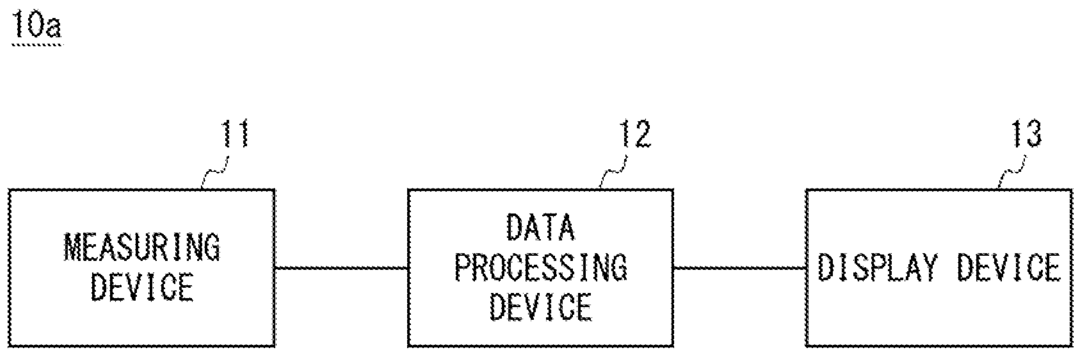
FIG. 2 is a block diagram illustrating a monitoring system according to a second example embodiment.

As shown in FIG. 2, a monitoring system 10*a* according to the second example embodiment includes a measuring device 11, a data processing device 12, and a display device 13.

The measuring device 11 includes a device that acquires three-dimensional shape data of a target to be monitored, and outputs point cloud data that is a set of points having three-dimensional coordinates. Each point of the aforementioned point cloud data may be assigned reflection brightness of the laser light and color information. The data processing device 12 is a device that performs processing on the point cloud data acquired by the measuring device 11 to determine an abnormality in a target to be monitored and identify the location where the abnormality has occurred. The display device 13 is a device that displays information about the abnormality that is determined to have occurred by the data processing device 12 to the person performing the monitoring work in a visually confirmable manner. In the following example embodiments, details of the data processing device 12 will be described.

Figure 3:
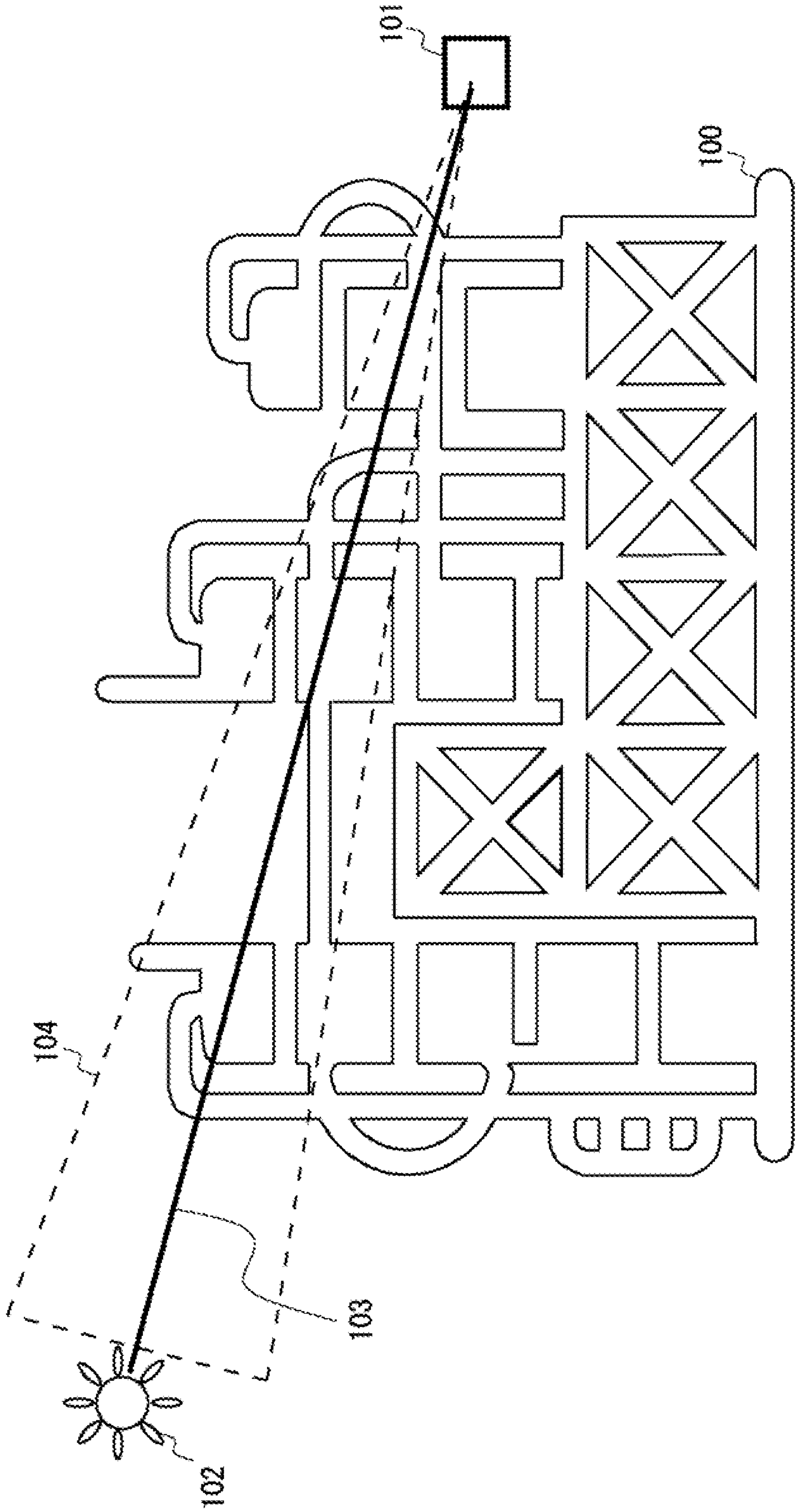
FIG. 3 is a diagram illustrating an operation of determining a three-dimension invalid region based on the location of a measuring device and the location of a light source according to the second example embodiment.

FIG. 3 is a diagram illustrating an operation of determining a three-dimension invalid region based on the location of a measuring device and the location of a light source according to a second example embodiment. A target to be measured 100 is a target to be measured by the three-dimensional measuring device 101 included in the measuring device 11 and it is assumed that a light source 102 was present at the time when the measurement was carried out. The three-dimensional measuring device 101 is a device that acquires three-dimensional shape data, including LiDAR. The light source 102 is an object that emits high-intensity light, including the sun and lighting. In the case where the light emitted from the light source 102 reaches the three-dimensional measuring device 101, the point cloud data included in a straight line 103 connecting the two points at the three-dimensional measuring device 101 and the light source 102 and in the three-dimension invalid region 104 that is a region around the straight line 103 contains noise because the light from the light source 102 is received as noise. Therefore, the data measurement performed in the three-dimension invalid region 104 is inaccurate and there is a possibility of an abnormality being erroneously detected in the case where monitoring processing means is applied.

In the present example embodiment, as a system that can avoid deficiency in the measurement information due to a light source, independent of the operating systems in the three-dimensional measuring device 101, a system that performs exception handling on the point cloud data included in the three-dimension invalid region 104 of the target to be measured 100 is disclosed. Note that in FIG. 3, the three-dimension invalid region 104 has a conical contour with the coordinates of the three-dimensional measuring device 101 as vertex, but the contour may be cylindrical and the bottom may be oval.

Figure 4:
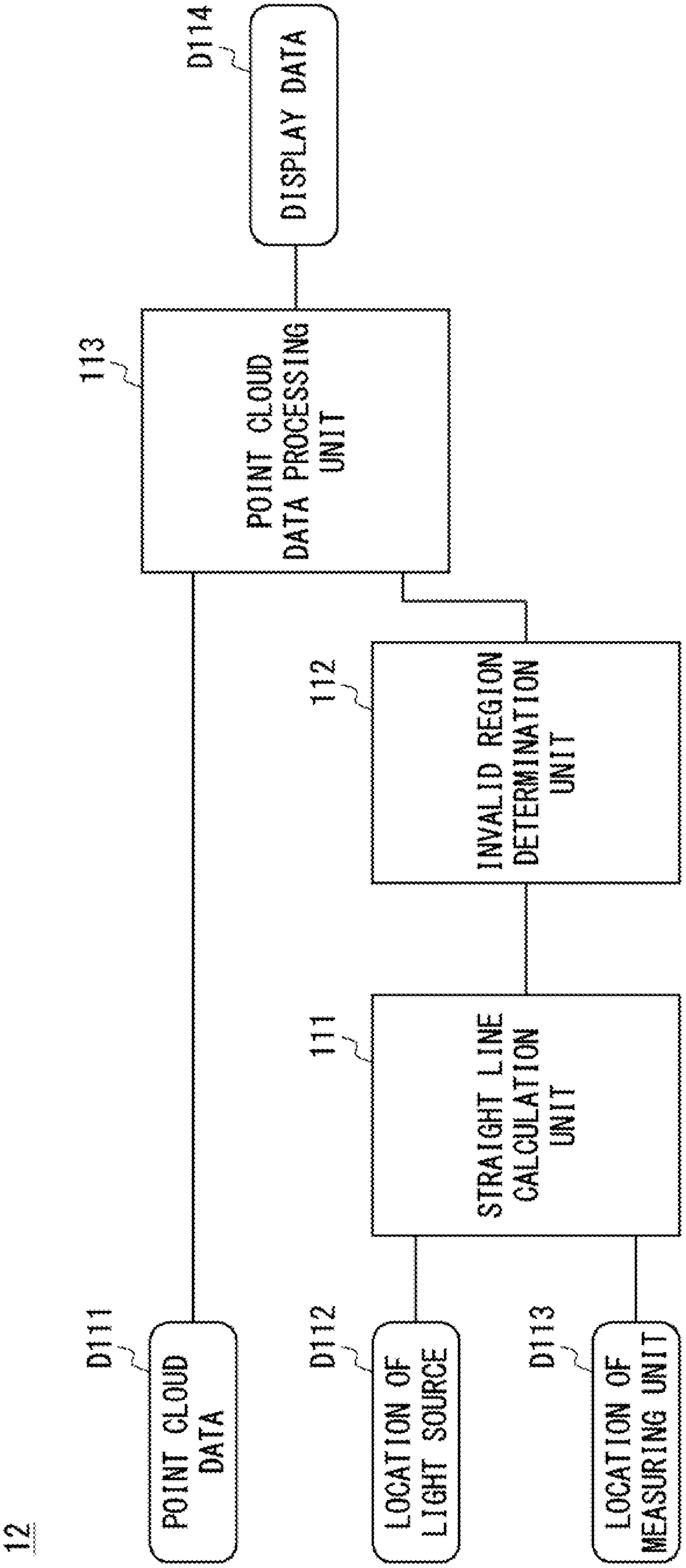
FIG. 4 is a block diagram illustrating operations of processing point cloud data after determining a three-dimension invalid region according to the second example embodiment.

FIG. 4 is a block diagram of the data processing device 12 illustrating operations of processing point cloud data after determining a three-dimension invalid region according to the second example embodiment of the present disclosure. Point cloud data D111 is the point cloud data that is output from the measuring device 11. Location D112 of the light source and location D113 of the measuring device are values that identify a three-dimensional space (location), such as the three-dimensional coordinate values, and may be designated from the outside. The straight line calculation unit 111 calculates the straight line connecting two points at the location D112 of the light source and the location D113 of the measuring device. The invalid region determination unit 112 determines a three-dimensional region that is a target of exception handling as the three-dimension invalid region based on the straight line calculated by the straight line calculation unit 111. The point cloud data processing unit 113 processes the point cloud data D111 setting the three-dimension invalid region output from the invalid region determination unit 112 as the target of exception handling, and outputs display data D114 to be displayed on a monitoring screen. Details of the point cloud data processing unit 113 will be described in third to sixth example embodiments.

Figure 5:
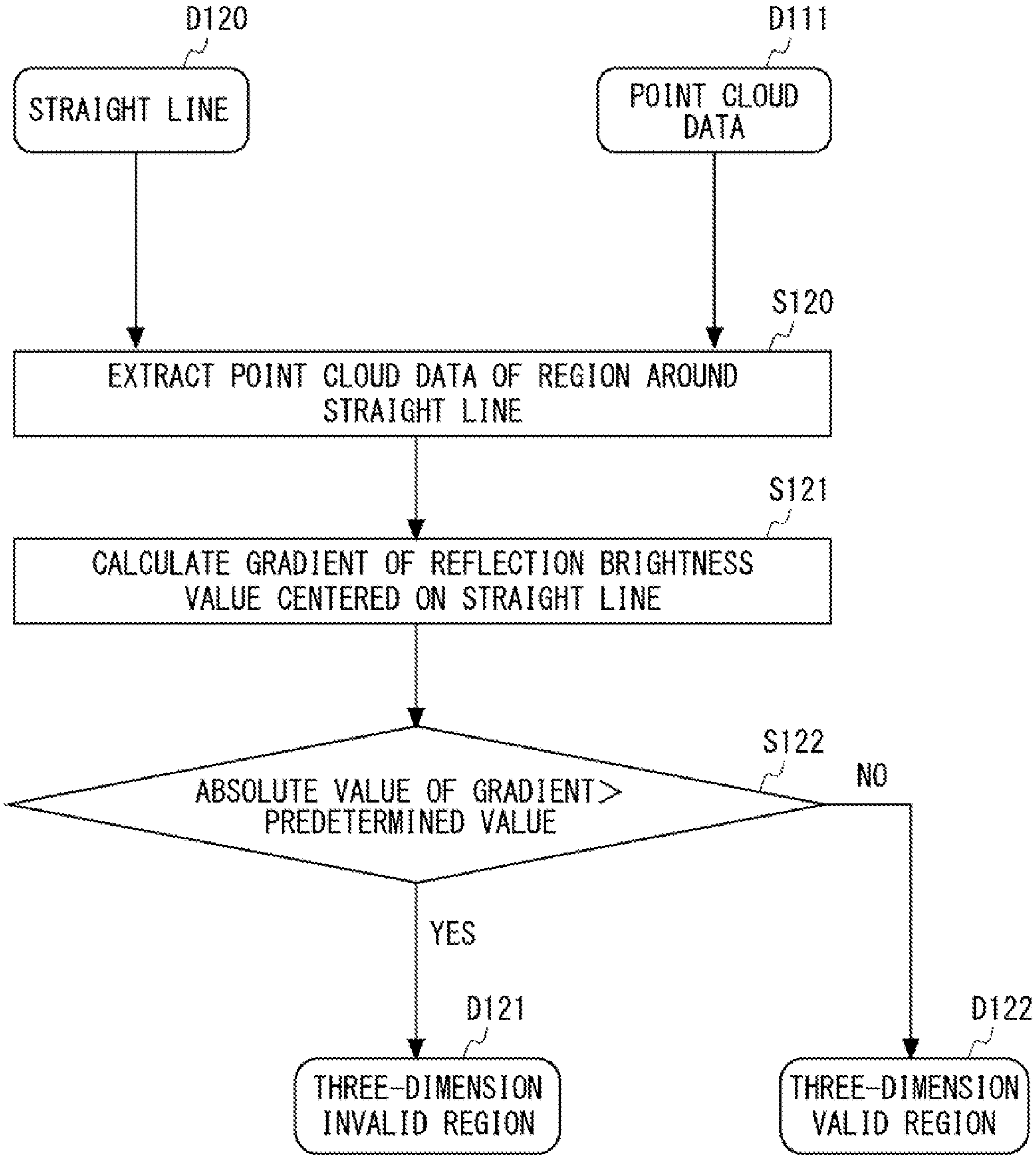
FIG. 5 is a flowchart illustrating processing of determining a three-dimension invalid region according to the second example embodiment.

FIG. 5 is a flowchart illustrating processing performed by the invalid region determination unit 112 according to the second example embodiment. A value expressing the reflection brightness is assigned to each point in the point cloud data D111. A straight line D120 is a straight line calculated by the straight line calculation unit 111. The invalid region determination unit 112 extracts data corresponding to the region around the straight line D120 from the point cloud data D111 (Step S120). The region around the straight line D120 is defined by, for example, a method of defining a region by a radius around the axis of the straight line D120. The invalid region determination unit 112 calculates the gradient of the reflection brightness value centered on the straight line D120 for the point cloud data extracted in Step S130 described later (Step S121). A method of calculating the gradient of the reflection brightness value radially centered on the straight line D120 for the point cloud data projected in the direction of the straight line D120 is given as an example. Based on the points in the neighborhood of each point, processing of reducing measurement errors of the reflection brightness values may be performed. In the case where an absolute value of the gradient calculated in Step S131 to be described later exceeds a predetermined value (Step S122: YES), the invalid region determination unit 112 outputs the corresponding region as a three-dimension invalid region D121. In the case where an absolute value of the gradient calculated in Step S121 is below a predetermined value (Step S122: NO), the invalid region determination unit 112 sets the corresponding region as a three-dimension valid region D122.

Figure 6:
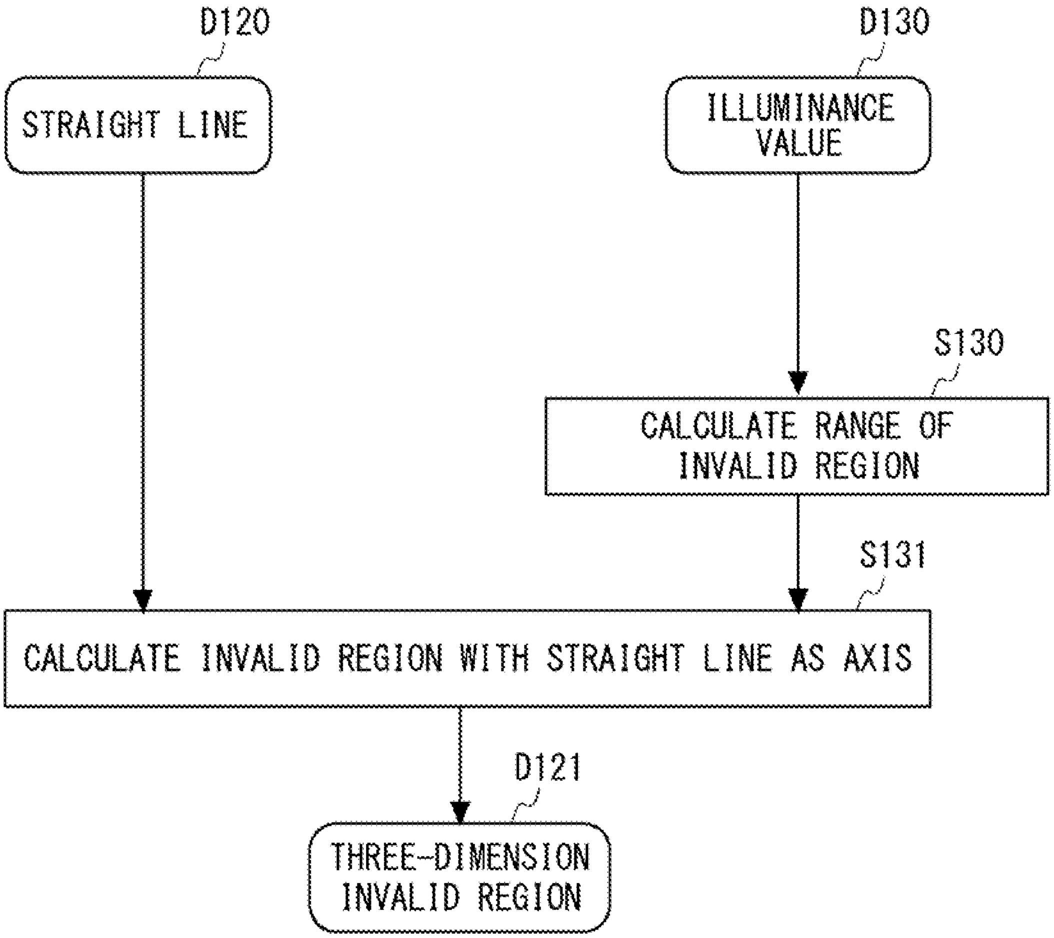
FIG. 6 is a flowchart illustrating processing of determining a three-dimension invalid region according to the second example embodiment.

FIG. 6 is a flowchart illustrating processing of the invalid region determination unit 112 according to the second example embodiment. The device for measuring an illuminance value D130 is a sensor for measuring the degree of illuminance included in the measuring device 11, and may be installed in the vicinity of the three-dimensional measuring device 101. This sensor is a device for measuring brightness of ambient light, and may be an illuminance sensor or a camera that captures optical images. The invalid region determination unit 112 calculates the range of the region determined to be invalid based on the illuminance value D130 (Step S130). The aforementioned range is determined, for example, by referring to a table in which the radius corresponding to the illuminance value is recorded or based on a formula that identifies the radius for the illuminance value. Note that the value of the radius may be varied depending on the distance from the measuring device 11. The invalid region determination unit 112 outputs the range with the straight line D120 as axis determined in Step S130 as the three-dimension invalid region D121 (Step S131).

As described above, the monitoring system according to the second example embodiment can identify the three-dimensional region determined to be disturbed by noise caused by the light source and then apply the exception handling to the measured point cloud data. As a result, in the method described in Patent Literature 1, it is possible to configure a monitoring system that performs processing of the point cloud data which has been disturbed by a light source such as the sun in a way that it is independent of the operating systems of the measuring device.

Third Example Embodiment

Figure 7:
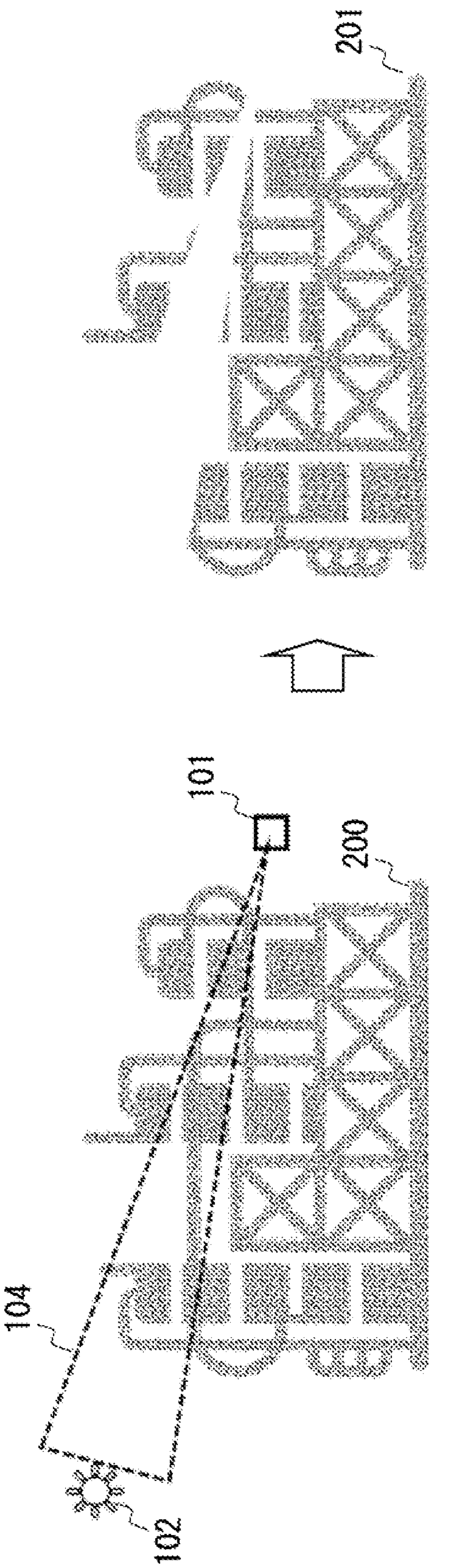
FIG. 7 is a diagram illustrating operations of removing point cloud data included in a three-dimension invalid region according to a third example embodiment.

FIG. 7 is a diagram illustrating operations of removing point cloud data included in a three-dimension invalid region by the point cloud data processing unit 113 according to the second example embodiment. Point cloud to be measured 200 is measured by the three-dimensional measuring device 101. As in FIG. 3, it is assumed that there is a light source 102 at the time when the measurement was carried out and the three-dimension invalid region 104 was defined according to the second example embodiment. Point cloud to be measured 201 is point cloud obtained by removing point cloud corresponding to the three-dimension invalid region 104 from the point cloud to be measured 200. The present example embodiment is an embodiment in which erroneous determination of an abnormality in the three-dimension invalid region 104 can be avoided by removing the three-dimension invalid region 104 from the point cloud to be measured 200 before applying the processing of detecting an abnormality of the target to be monitored to the point cloud data and converting the point cloud data to the point cloud to be measured 201.

Figure 8:
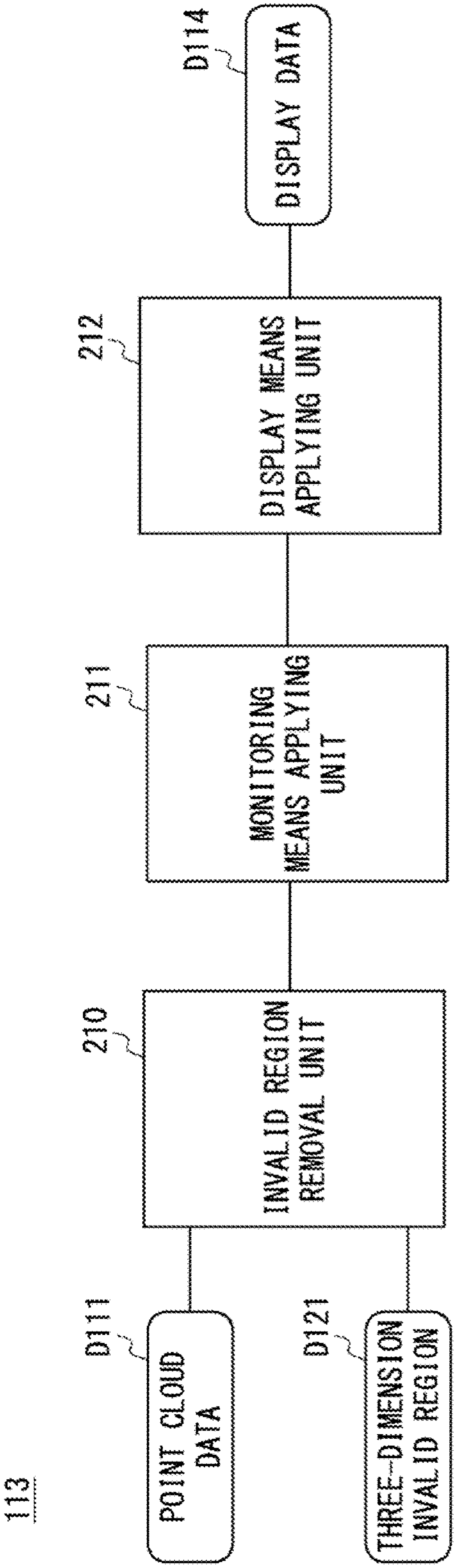
FIG. 8 is a block diagram illustrating operations of removing point cloud data included in a three-dimension invalid region according to the third example embodiment.

FIG. 8 is a block diagram of the point cloud data processing unit 113 illustrating operations of removing point cloud data included in a three-dimension invalid region according to the third example embodiment. The point cloud data D111 is data output from the measuring device 11. The three-dimension invalid region D121 is a three-dimensional region determined by the invalid region determination unit 112. An invalid region removal unit 210 removes the point cloud data included in the three-dimension invalid region D121 from the point cloud data D111 and outputs the obtained point cloud data. A monitoring means applying unit 211 applies the processing of determining an abnormality and identifying the location of the abnormality using the point cloud data output from the invalid region removal unit 210. A display means applying unit 212 outputs abnormality information output from the monitoring means applying unit 211 as display data D114 that can be identified by a display device installed in a latter part of the system.

As described above, the monitoring system according to the third example embodiment performs operations to remove point cloud data included in the three-dimension invalid region in advance as a method of performing exception handling of the three-dimension invalid region in the first example embodiment. As a result, it is possible to configure a monitoring system that does not make erroneous determination of an abnormality within the region disturbed by the light source.

Fourth Example Embodiment

Figure 9:
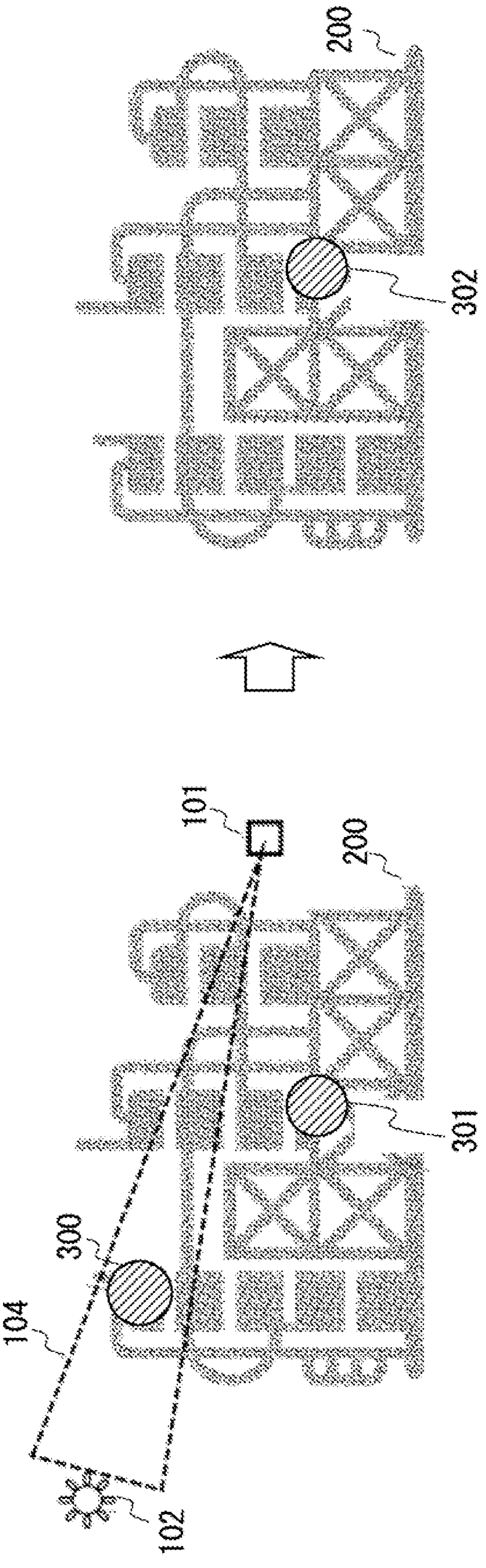
FIG. 9 is a diagram illustrating operations of removing point cloud data of a monitoring result included in a three-dimension invalid region according to a fourth example embodiment.

FIG. 9 is a diagram illustrating operations of removing point cloud data of a monitoring result included in a three-dimension invalid region in the point cloud data processing unit 113 according to a fourth example embodiment. As in FIG. 7, the system includes the point cloud to be measured 200, the three-dimensional measuring device 101, and the light source 102, and the three-dimension invalid region 104 is defined. Monitoring result point cloud 300 and 301 are the locations of abnormalities (abnormality determined locations) that are output after performing processing for determination of an abnormality to be monitored on the point cloud to be measured 200. The monitoring result point cloud data 300 is included in the three-dimension invalid region 104 and the monitoring result point cloud data 301 is not included in the three-dimension invalid region 104. The present example embodiment is an embodiment in which after applying the processing of detecting an abnormality of the target to be monitored based on the point cloud data, the monitoring result point cloud 300 included in the three-dimension invalid region 104 is removed while leaving the monitoring result point cloud data 301 that is not included in the three-dimension invalid region 104 as the monitoring result point cloud data 302.

Figure 10:
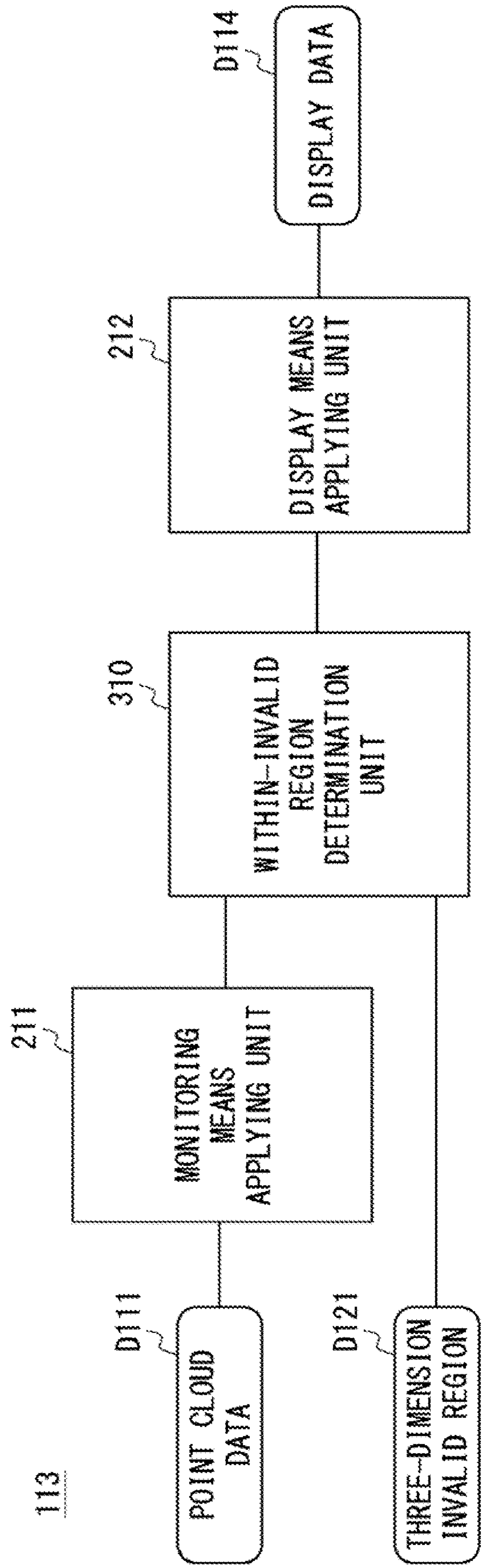
FIG. 10 is a block diagram illustrating operations of removing point cloud data of a monitoring result included in a three-dimension invalid region according to the fourth example embodiment.

FIG. 10 is a block diagram of the point cloud data processing unit 113 illustrating operations of removing point cloud data of the monitoring result included in the three-dimension invalid region according to the fourth example embodiment. The point cloud data D111 is data output from the measuring device 11. The three-dimension invalid region D121 is a three-dimensional region determined by the invalid region determination unit 112. The monitoring means applying unit 211 applies the processing of determining an abnormality and identifying the location of the abnormality using the point cloud data D111. A within-invalid region determination unit 310 removes data included in the three-dimension invalid region D121 from the abnormality information output from the monitoring means applying unit 211. The display means applying unit 212 outputs abnormality information output from the within-invalid region determination unit 310 as display data D114 that can be identified through a display device installed in a latter part of the system.

As described above, the monitoring system according to the fourth example embodiment performs, as a method of performing exception handling of the three-dimension invalid region in the second example embodiment, an operation of removing point cloud data included in the three-dimension invalid region after performing determination of an abnormality to be monitored. As result, it is possible to configure a monitoring system that does not make erroneous determination of an abnormality within the region disturbed by the light source.

Fifth Example Embodiment

In the present example embodiment, means for integrating point cloud data after performing re-measurement of the target to be monitored in the third to fourth example embodiments will be shown. In the example embodiments described so far, since the three-dimension invalid region of the target be monitored is ignored, even if an abnormality occurs, it will be overlooked. Since a light source represented by the sun changes its position depending on the time of day, the three-dimension invalid region changes depending on the time of day. That is, by performing re-measurement of the target at the time when the position of the light source has changed, the locations falling in the three-dimension invalid region are measured, and by integrating the measured data, the whole region to be monitored can be measured.

Figure 11:
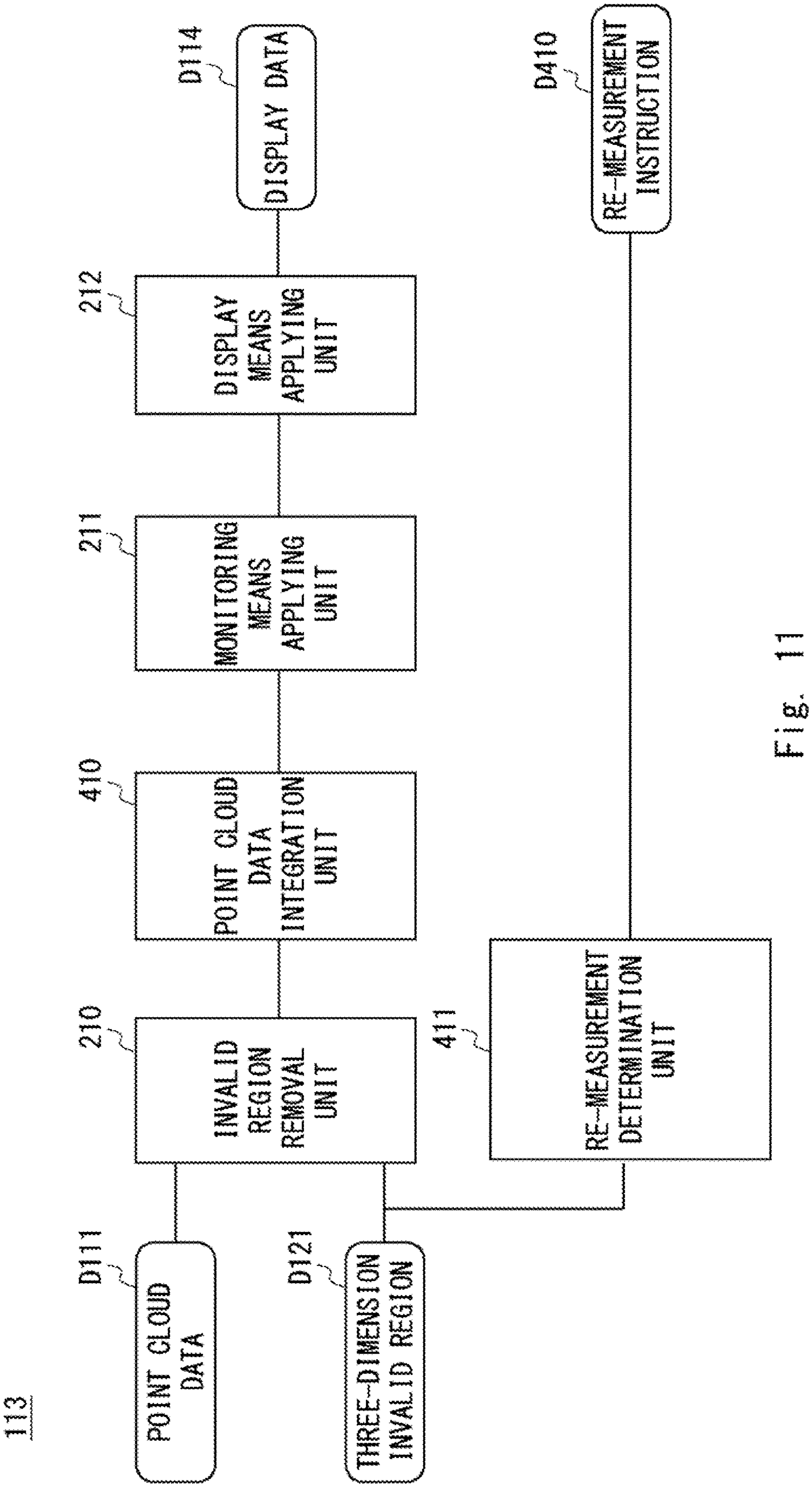
FIG. 11 is a block diagram illustrating operations of instructing re-measurement after removing point cloud data included in a three-dimension invalid region according to a fifth example embodiment.

FIG. 11 is a block diagram of the point cloud data processing unit 113 illustrating operations of instructing re-measurement after removing point cloud data included in a three-dimension invalid region according to a fifth example embodiment. FIG. 11 corresponds to a modified example of the third example embodiment. The invalid region removal unit 210, the monitoring means applying unit 211, and the display means applying unit 212 operate in the same manner as those described in the third example embodiment.

A re-measurement determination unit 411 calculates the time at which the point cloud data in the three-dimension invalid region can be acquired in the case where there is a region present in the three-dimension invalid region D121 and then give an instruction to the measuring device 11 to carry out re-measurement at the calculated time as a re-measurement instruction D410.

Here, an operation example of performing calculation of the time at which the point cloud data can be acquired will be described. In the case where the light source is the sun, the trajectory of the sun and a table is referred to, and the position of the light source at any selected time is estimated. Then, based on the method of determining the three-dimension invalid region in the second example embodiment, the range of the three-dimension invalid region at any selected time is calculated using the estimated position of the light source. The time at which the region falling in the three-dimension invalid region deviates from the three-dimension invalid region is set as the time for performing re-measurement.

A point cloud data integration unit 410 integrates the acquired point cloud data and the point cloud data acquired by performing re-measurement. An operation example thereof is cutting out the region corresponding to the three-dimension invalid region from the point cloud data acquired by performing re-measurement and adding it to the acquired point cloud data.

Figure 12:
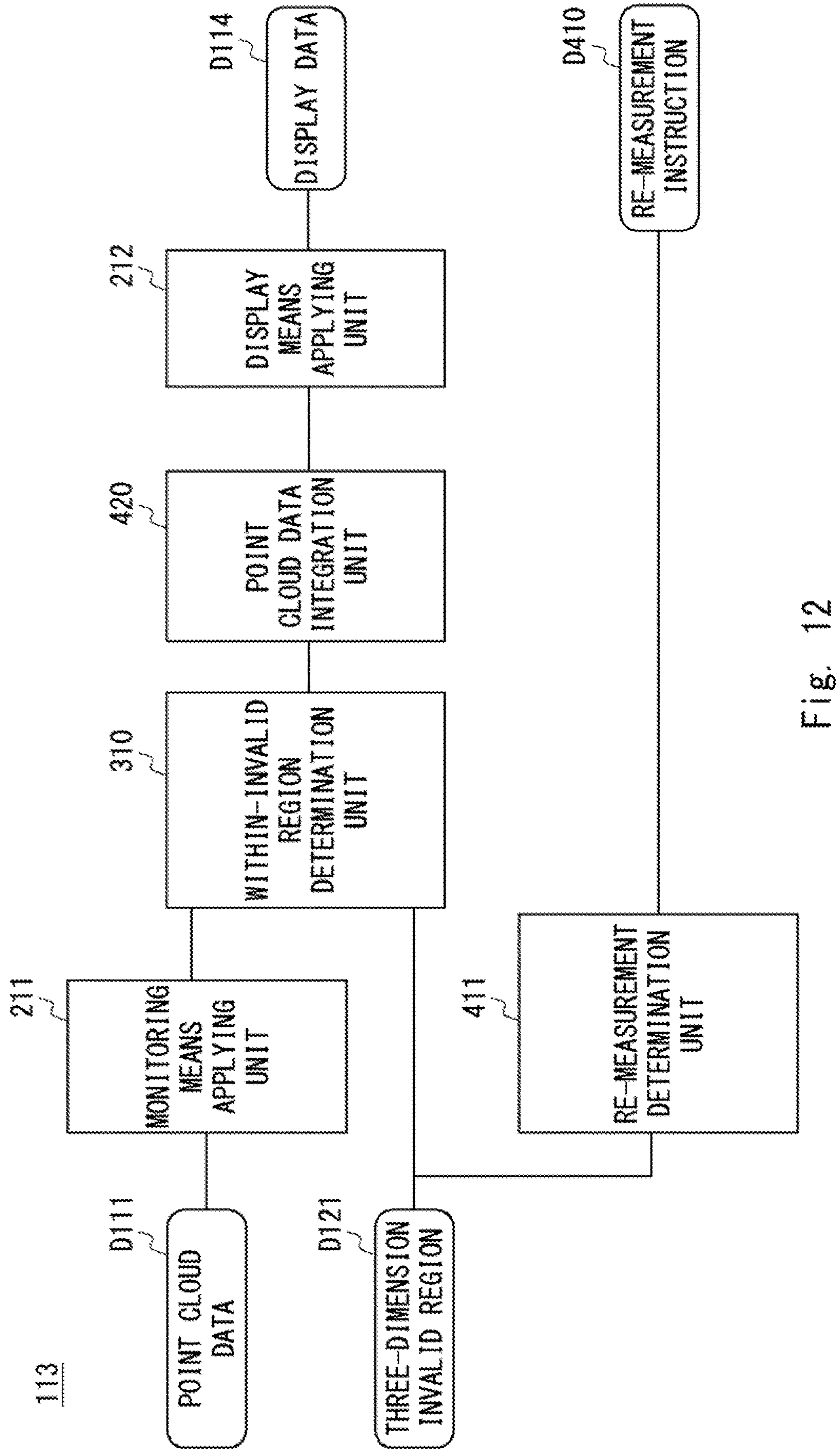
FIG. 12 is a block diagram illustrating operations of instructing re-measurement after removing point cloud data of a monitoring result included in a three-dimension invalid region according to the fifth example embodiment.

FIG. 12 is a block diagram of the point cloud data processing unit 113, illustrating operations for giving instructions to perform re-measurement after removal of the point cloud data of a monitoring result included in a three-dimension invalid region according to the fifth example embodiment. FIG. 12 corresponds to a modified example of the fourth example embodiment. The within-invalid region determination unit 310, the monitoring means applying unit 211, and the display means applying unit 212 operate in the same manner as those described in the fourth example embodiment. The re-measurement determination unit 411 operates in the same manner as that described in the description of FIG. 11. A point cloud data integration unit 420 integrates the acquired abnormality information and the abnormality information acquired by performing re-measurement. An example of integration method is the same as that described for FIG. 11 and differs on the point that abnormality information is integrated.

Figure 13:
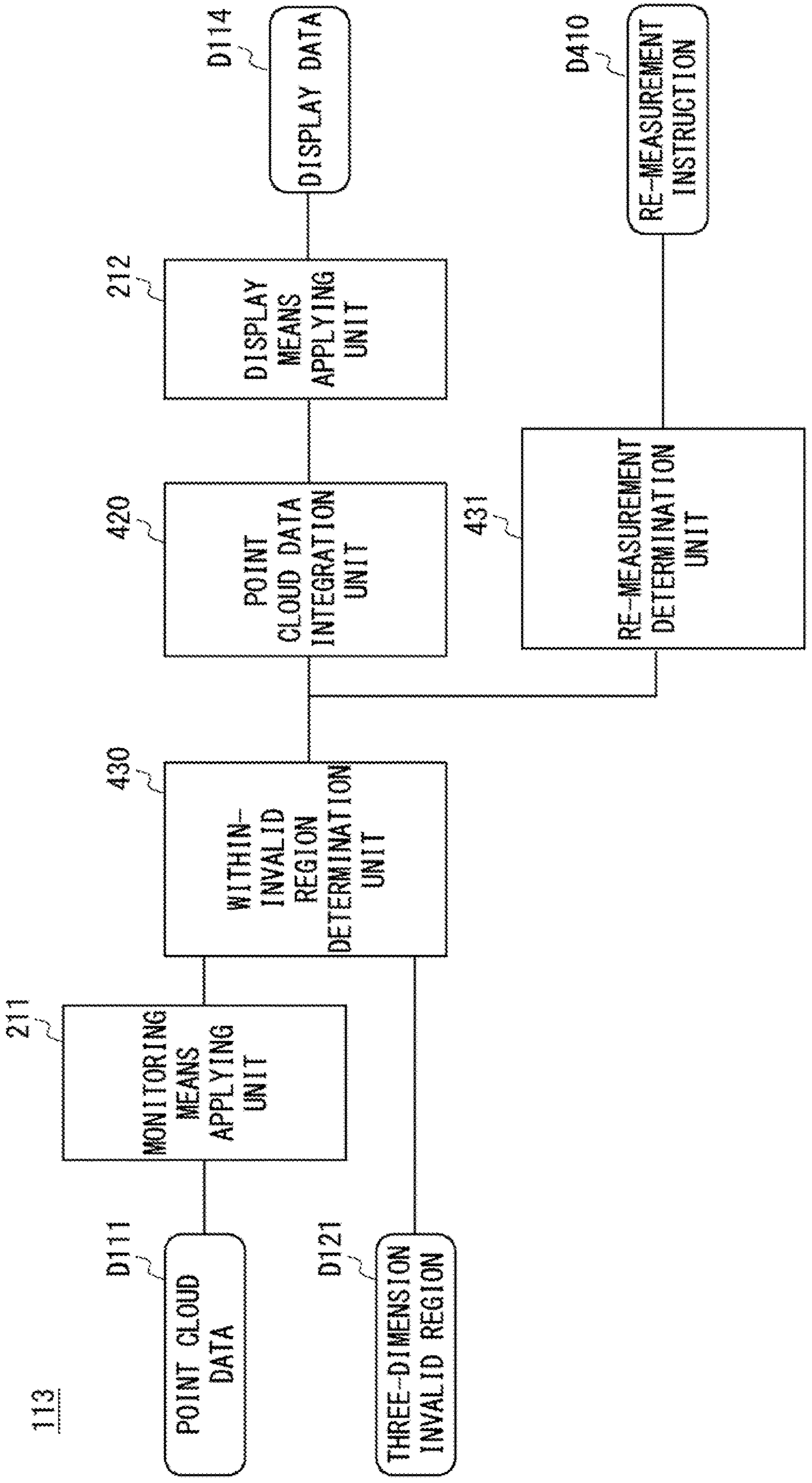
FIG. 13 is a block diagram illustrating operations of instructing re-measurement after removing point cloud data of a monitoring result included in a three-dimension invalid region according to the fifth example embodiment.

FIG. 13 is a block diagram of the point cloud data processing unit 113, illustrating operations of instructing re-measurement after removing point cloud data of a monitoring result included in a three-dimension invalid region according to the fifth example embodiment. FIG. 13 corresponds to a modified example of the third example embodiment. The monitoring means applying unit 211, the display means applying unit 212, and the point cloud data integration unit 420 operate in the same manner as those described in the description of FIG. 12. A within-invalid region determination unit 430 outputs a re-measurement instruction in the case where there is determination of an abnormality present within the three-dimension invalid region in addition to the operation of the within-invalid region determination unit 310. A re-measurement determination unit 431 outputs an instruction to perform re-measurement in the same manner as the re-measurement determination unit 411 in the case where there is an instruction to perform re-measurement from the within-invalid region determination unit 430.

As described above, the monitoring system according to the fifth example embodiment compliments the determination of an abnormality in the three-dimension invalid region of the target to be monitored by preforming re-measurement at the specified time in the third to fourth example embodiments. As a result, the region that has been omitted due to the exception handling can be monitored without being omitted.

Sixth Example Embodiment

Figure 14:
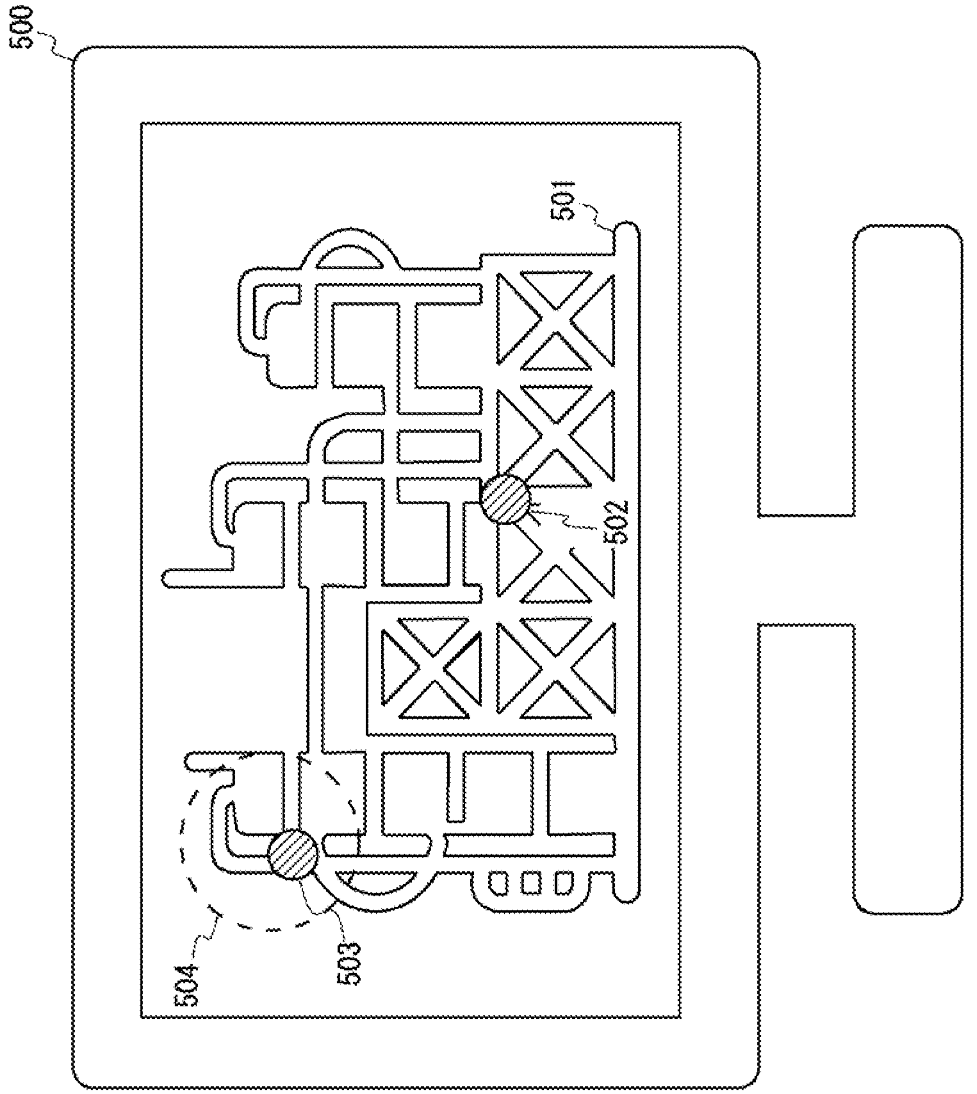
FIG. 14 is a diagram illustrating operations of showing a three-dimension invalid region on a monitoring screen according to the fifth example embodiment.

FIG. 14 is a diagram illustrating operations of showing a three-dimension invalid region on a monitoring screen by the point cloud data processing unit 113 according to a sixth example embodiment. A monitoring screen 500 displays a screen on the display device 13 through which information is given to the person performing the monitoring work. A target-of-monitoring display 501 indicates the target to be measured and has the person performing the monitoring work visually confirm the location determined to be abnormal. An example thereof is point cloud data display. Monitoring result displays 502, 503 indicate the locations determined to be abnormal by the point cloud data processing unit 113. Attention-paying display 504 indicates a region corresponding to the three-dimension invalid region, and the monitoring result display 503 is included in this region.

In this example embodiment, the operation of removing the point cloud data corresponding to the three-dimension invalid region is not performed but instead the point cloud data corresponding to the three-dimension invalid region is displayed as the region to which attention is to be paid to the person performing the monitoring work whereby the person performing the monitoring work can be informed that the determination of an abnormality included in the three-dimension invalid region is unreliable. Note that in FIG. 14, the three-dimension invalid region is shown surrounded by the dotted lines, but any way of indication may be adopted as long as the location corresponding to the three-dimension invalid region is visually confirmable by the person performing the monitoring work such as changing the color of the monitoring result display 503 or the like.

Figure 15:
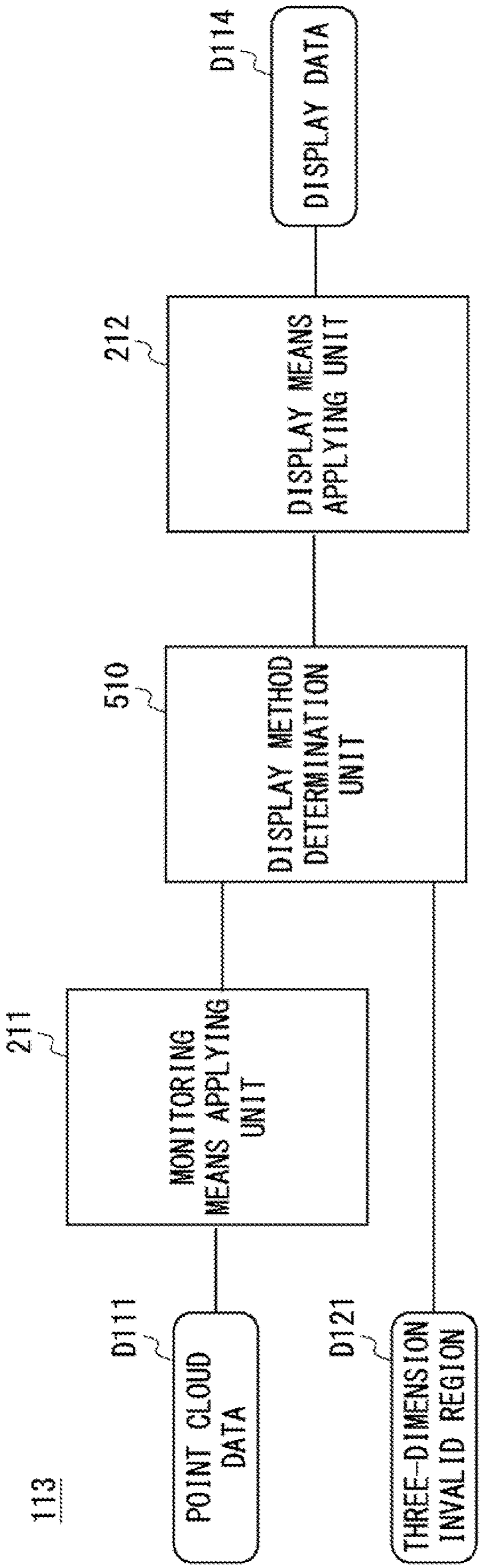
FIG. 15 is a block diagram illustrating operations of showing a three-dimension invalid region on a monitoring screen according to the fifth example embodiment.

FIG. 15 is a block diagram of the point cloud data processing unit 113 illustrating operations of showing a three-dimension invalid region on a monitoring screen according to the sixth example embodiment. The point cloud data D111 is data output from the measuring device 11. The three-dimension invalid region D121 is a three-dimensional region determined by the invalid region determination unit 112. The monitoring means applying unit 211 applies the processing of determining an abnormality and the processing of identifying the location of the abnormality using the point cloud data D111. A display method determination unit 510 outputs abnormality information along with a display method so that the shape of the three-dimension invalid region can be visually confirmed through the display device 13. The display means applying unit 212 outputs abnormality information output from the display method determination unit 510 and display information of the three-dimension invalid region as display data D114 that can be identified through a display device installed in a latter part of the system.

As described above, the monitoring system according to the sixth example embodiment displays the three-dimension invalid region in such a manner that it is visually confirmable by the person performing the monitoring work as a method of performing exception handling of the three-dimension invalid region in the second example embodiment. As a result, even if an abnormality is detected within the region disturbed by a light source, it is possible to configure a monitoring system that informs the person performing the monitoring work that the information is unreliable.

Note that in the aforementioned first to sixth example embodiments, the present disclosure has been described as a hardware configuration but it is not limited thereto. In the present disclosure, the processing of each of the structural elements can be implemented by causing a CPU (Central Processing Unit) execute a computer program.

In the aforementioned examples, a program can be stored and provided to a computer using any type of non-transitory computer readable media. Non-transitory computer readable media include any type of tangible storage media. Examples of non-transitory computer readable media include magnetic storage media (e.g. floppy disks, magnetic tapes, hard disk drives), optical magnetic storage media (e.g. magneto-optical disks), CD-ROM (Read Only Memory), CD-R, CD-R/W, DVD (Digital Versatile Disc), semiconductor memories (e.g. mask ROM, PROM (Programmable ROM), EPROM (Erasable PROM), flash ROM, and RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line such as electric wires and optical fibers or a wireless communication line.

The present disclosure has been described with reference to the example embodiments but the present disclosure is not limited to the above-described example embodiments, and can be appropriately changed without departing from the gist of the present disclosure.

The whole or part of the example embodiments disclosed above can be described as, but not limited to, the following supplementary notes.

Supplementary Note 1

A monitoring system comprising:

straight line calculation means for calculating a straight line connecting three-dimensional coordinates of a light source and three-dimensional coordinates of a three-dimensional measuring device configured to measure a target to be measured;

invalid region determination means for defining a three-dimension invalid region in which point cloud data acquired by the three-dimensional measuring device is invalid based on the straight line; and point cloud data processing means for monitoring the target to be measured based on the acquired point cloud data and the three-dimension invalid region.

Supplementary Note 2

The monitoring system described in Supplementary Note 1, wherein a reflection brightness value is assigned to each point in the acquired point cloud data, and the invalid region determination means extracts the point cloud data of a region around the straight line from the acquired point cloud data based on the straight line, calculates a gradient of a reflection brightness value from the straight line for the acquired point cloud data, and determines a region in which an absolute value of the gradient is greater than a predetermined value as the three-dimension invalid region.

Supplementary Note 3

The monitoring system described in Supplementary Note 1 or 2, wherein the invalid region determination means determines the three-dimension invalid region around the straight line based on an illuminance value acquired by an illuminance measurement device that is installed in the vicinity of the three-dimensional measuring device.

Supplementary Note 4

The monitoring system described in any one of Supplementary Notes 1 to 3, wherein the point cloud data processing means includes:

invalid region removal means for removing point cloud data included in the three-dimension invalid region from the acquired point cloud data and generating effective point cloud data; and monitoring means applying means for identifying a location of an abnormality based on the effective point cloud data and outputting a result of identification as monitoring processing data.

Supplementary Note 5

The monitoring system described in any one of Supplementary Notes 1 to 3, wherein the point cloud data processing means includes:

monitoring means applying means for identifying a location of an abnormality based on the acquired point cloud data and outputting a result of identification as a monitoring processing data candidate; and invalid region removal means for removing the location of abnormality included in the three-dimension invalid region from the monitoring processing data candidate and outputting the remaining candidate as monitoring processing data.

Supplementary Note 6

The monitoring system described in Supplementary Note 4, further comprising:

re-measurement determination means for calculating a time at which valid measurement can be performed in the three-dimension invalid region and giving an instruction to perform measurement at the calculated time to the three-dimension measuring device; and point cloud data integration means for integrating point cloud data included in the three-dimension invalid region among re-measured point cloud data, which is the acquired point cloud data at the calculated time, to the effective point cloud data.

Supplementary Note 7

The monitoring system described in Supplementary Note 5, further comprising:

re-measurement determination means for calculating a time at which valid measurement can be performed in the three-dimension invalid region and giving an instruction to perform measurement at the calculated time to the three-dimension measuring device; and point cloud data integration means for identifying the location of an abnormality based on re-measured point cloud data which is the acquired point cloud data at the calculated time and integrating the location of the abnormality included in the three-dimension invalid region among re-measured monitoring processing data, which is the result of the identification, to the monitoring processing data.

Supplementary Note 8

The monitoring system described in Supplementary Note 5, further comprising:

re-measurement determination means for calculating a time at which valid measurement can be performed in the three-dimension invalid region and giving an instruction to perform measurement at the calculated time to the three-dimension measuring device in the case where the monitoring processing data candidate includes the location of an abnormality included in the three-dimension invalid region; and point cloud data integration means for identifying the location of the abnormality based on re-measured point cloud data, which is the acquired point cloud data at the calculated time, and integrating the location of abnormality included in the three-dimension invalid region among re-measured monitoring processing data, which is the result of the identification, to the monitoring processing data.

Supplementary Note 9

The monitoring system described in any one of Supplementary Notes 1 to 3, wherein the point cloud data processing means includes:

monitoring means applying means for identifying a location of an abnormality based on the acquired point cloud data and outputting a result of identification as a monitoring processing data candidate; and display method determination means for displaying the location of the abnormality included in the three-dimension invalid region among the monitoring processing data candidates in a form of display different from a form of display of locations of other abnormalities.

Supplementary Note 10

A monitoring method comprising:

calculating a straight line connecting three-dimensional coordinates of a light source and three-dimensional coordinates of a three-dimensional measuring device configured to measure a target to be measured;

defining a three-dimension invalid region in which point cloud data acquired by the three-dimensional measuring device is invalid based on the straight line; and monitoring the target to be measured based on the acquired point cloud data and the three-dimension invalid region.

Supplementary Note 11

A non-transitory computer-readable medium storing a monitoring program for causing a computer to execute processing of:

calculating a straight line connecting three-dimensional coordinates of a light source and three-dimensional coordinates of a three-dimensional measuring device configured to measure a target to be measured;

defining a three-dimension invalid region in which point cloud data acquired by the three-dimensional measuring device is invalid based on the straight line; and monitoring the target to be measured based on the acquired point cloud data and the three-dimension invalid region.

REFERENCE SIGNS LIST

10, 10*a*: MONITORING SYSTEM
11: MEASURING DEVICE
12: DATA PROCESSING DEVICE
13: DISPLAY DEVICE
100: TARGET TO BE MEASURED
101: THREE-DIMENSIONAL MEASURING DEVICE
102: LIGHT SOURCE
103: STRAIGHT LINE
104: THREE-DIMENSION INVALID REGION
111: STRAIGHT LINE CALCULATION UNIT
112: INVALID REGION DETERMINATION UNIT
113: POINT CLOUD DATA PROCESSING UNIT
210: INVALID REGION REMOVAL UNIT
211: MONITORING MEANS APPLYING UNIT
212: DISPLAY MEANS APPLYING UNIT
310, 430: WITHIN-INVALID REGION DETERMINATION UNIT
200, 201: POINT CLOUD TO BE MEASURED
300, 301, 302: MONITORING RESULT POINT CLOUD
410, 420: POINT CLOUD DATA INTEGRATION UNIT
411, 431: RE-MEASUREMENT DETERMINATION UNIT
420: POINT CLOUD DATA INTEGRATION UNIT
500: MONITORING SCREEN
501: TARGET-OF-MONITORING DISPLAY
502, 503: MONITORING RESULT DISPLAY
504: ATTENTION-PAYING DISPLAY
510: DISPLAY METHOD DETERMINATION UNIT

What is claimed is:

1. A monitoring system comprising:

at least one memory storing instructions; and at least one processor configured to execute the instructions to:

calculate a straight line connecting three-dimensional coordinates of a light source and three-dimensional coordinates of a three-dimensional measuring device configured to measure a target to be measured;

define a three-dimension invalid region in which point cloud data acquired by the three-dimensional measuring device is invalid based on the straight line; and monitor the target to be measured based on the acquired point cloud data and the three-dimension invalid region, wherein a reflection brightness value is assigned to each point in the acquired point cloud data, and the at least one processor is further configured to execute the instructions to:

extract the point cloud data of a region around the straight line from the acquired point cloud data based on the straight line, calculate a gradient of the reflection brightness value from the straight line for the acquired point cloud data, and determine a region in which an absolute value of the gradient is greater than a predetermined value as the three-dimension invalid region.

2. The monitoring system according to claim 1, wherein the at least one processor is further configured to execute the instructions to:

determine the three-dimension invalid region around the straight line based on an illuminance value acquired by an illuminance measurement device that is installed in the vicinity of the three-dimensional measuring device.

3. The monitoring system according to claim 1, wherein the at least one processor is further configured to execute the instructions to:

remove point cloud data included in the three-dimension invalid region from the acquired point cloud data and generate effective point cloud data; and identify a location of an abnormality based on the effective point cloud data and output a result of identification as monitoring processing data.

4. The monitoring system according to claim 1, wherein the at least one processor is further configured to execute the instructions to:

identify a location of an abnormality based on the acquired point cloud data and output a result of identification as a monitoring processing data candidate; and remove the location of abnormality included in the three-dimension invalid region from the monitoring processing data candidate and output the remaining candidate as monitoring processing data.

5. The monitoring system according to claim 3, wherein the at least one processor is further configured to execute the instructions to:

calculate a time at which valid measurement can be performed in the three-dimension invalid region and give an instruction to perform measurement at the calculated time to the three-dimension measuring device; and integrate point cloud data included in the three-dimension invalid region among re-measured point cloud data, which is the acquired point cloud data at the calculated time, to the effective point cloud data.

6. The monitoring system according to claim 4, wherein the at least one processor is further configured to execute the instructions to:

calculate a time at which valid measurement can be performed in the three-dimension invalid region and give an instruction to perform measurement at the calculated time to the three-dimension measuring device; and identify the location of an abnormality based on re-measured point cloud data which is the acquired point cloud data at the calculated time and integrate the location of the abnormality included in the three-dimension invalid region among re-measured monitoring processing data, which is the result of the identification, to the monitoring processing data.

7. The monitoring system according to claim 4, wherein the at least one processor is further configured to execute the instructions to:

calculate a time at which valid measurement can be performed in the three-dimension invalid region and give an instruction to perform measurement at the calculated time to the three-dimension measuring device in the case where the monitoring processing data candidate includes the location of an abnormality included in the three-dimension invalid region; and identify the location of the abnormality based on re-measured point cloud data, which is the acquired point cloud data at the calculated time, and integrate the location of abnormality included in the three-dimension invalid region among re-measured monitoring processing data, which is the result of the identification, to the monitoring processing data.

8. The monitoring system according to claim 1, wherein the at least one processor is further configured to execute the instructions to:

identify a location of an abnormality based on the acquired point cloud data and output a result of identification as a monitoring processing data candidate; and display the location of the abnormality included in the three-dimension invalid region among the monitoring processing data candidates in a form of display different from a form of display of locations of other abnormalities.

9. A monitoring method comprising:

calculating a straight line connecting three-dimensional coordinates of a light source and three-dimensional coordinates of a three-dimensional measuring device configured to measure a target to be measured;

defining a three-dimension invalid region in which point cloud data acquired by the three-dimensional measuring device is invalid based on the straight line; and monitoring the target to be measured based on the acquired point cloud data and the three-dimension invalid region, wherein a reflection brightness value is assigned to each point in the acquired point cloud data, and the method further comprising:

extracting the point cloud data of a region around the straight line from the acquired point cloud data based on the straight line, calculating a gradient of the reflection brightness value from the straight line for the acquired point cloud data, and determining a region in which an absolute value of the gradient is greater than a predetermined value as the three-dimension invalid region.

10. A non-transitory computer-readable medium storing a monitoring program for causing a computer to execute processing of:

calculating a straight line connecting three-dimensional coordinates of a light source and three-dimensional coordinates of a three-dimensional measuring device configured to measure a target to be measured;

defining a three-dimension invalid region in which point cloud data acquired by the three-dimensional measuring device is invalid based on the straight line; and monitoring the target to be measured based on the acquired point cloud data and the three-dimension invalid region, wherein a reflection brightness value is assigned to each point in the acquired point cloud data, and the processing further comprising:

extracting the point cloud data of a region around the straight line from the acquired point cloud data based on the straight line, calculating a gradient of the reflection brightness value from the straight line for the acquired point cloud data, and determining a region in which an absolute value of the gradient is greater than a predetermined value as the three-dimension invalid region.

* * * * *